United States Patent
Lagas et al.

[11] Patent Number: 6,149,887
[45] Date of Patent: Nov. 21, 2000

[54] METHOD AND APPARATUS FOR DEGASSING SULFUR

[75] Inventors: Jan Adolf Lagas, Monnickendam; Johannes Borsboom, Rijswijk; Maria Louis Joseph Augustinus Wetzels, 's-Gravenhage, all of Netherlands

[73] Assignee: Stork Engineers & Contractors B.V., Amsterdam, Netherlands

[21] Appl. No.: 09/043,228

[22] PCT Filed: Sep. 16, 1996

[86] PCT No.: PCT/NL96/00360

§ 371 Date: Jul. 30, 1998

§ 102(e) Date: Jul. 30, 1998

[87] PCT Pub. No.: WO97/10174

PCT Pub. Date: Mar. 20, 1997

[30] Foreign Application Priority Data

Sep. 15, 1995 [NL] Netherlands ............................ 1001216
May 10, 1996 [NL] Netherlands ............................ 1003085

[51] Int. Cl.$^7$ .................................................. C01B 17/02
[52] U.S. Cl. ...................... 423/578.1; 422/188; 422/193; 422/224; 422/236
[58] Field of Search .................. 423/578.1; 422/188, 422/231, 236, 193, 224

[56] References Cited

FOREIGN PATENT DOCUMENTS

| 1002730 | 1/1977 | Canada ................................ 423/578.1 |
| 2185587 | 1/1974 | France . |
| 291 065 A5 | 6/1991 | Germany . |
| 291065A5 | 6/1991 | Germany . |
| 292 635 A5 | 8/1991 | Germany . |
| 292635A5 | 8/1991 | Germany . |
| 2203732A | 10/1988 | United Kingdom . |
| 9506616 | 3/1995 | WIPO . |

OTHER PUBLICATIONS

"Controlling H$_2$S Evolution From Sulphur", *Sulphur*, vol. 233, No. 4, Jul. 1994, London(GB), pp. 35–45.

*Primary Examiner*—Steven P. Griffin
*Assistant Examiner*—Timothy C Vanoy
*Attorney, Agent, or Firm*—Weingarten, Schurgin, Gagnebin & Hayes LLP

[57] ABSTRACT

A method is provided for removing hydrogen sulfide and hydrogen polysulfide compounds out of liquid sulfur by stripping with a gas, such as air. The method is conducted in an apparatus equipped with at least two degassing compartments and a sulfur collection pit wherein the degassing compartments are separated from each other by a first partition wall, the last degassing compartment is separated from the sulfur collection pit by a second partion wall and each degassing compartment contains at least first and second subcompartments which are separated from each other by a third partion wall and are open to each other at the top and the bottom. At least one first subcompartment in each said degassing compartment is provided, at the bottom thereof, with a plurality of stripping gas inlet nozzles and at least one second subcompartment in each said degassing compartment is not provided with stripping gas inlet nozzles. Furthermore, said at least one first subcompartment is constructed for flowing liquid sulfur over or through the first partition wall to a subsequent degassing compartment, the last degassing compartment is constructed for flowing liquid sulfur to the sulfur collection pit over the second partition wall and the apparatus is also provided with a provision for discharging gas comprising hydrogen saulfide.

16 Claims, 2 Drawing Sheets

METHOD AND APPARATUS FOR DEGASSING SULFUR

This application is a national stage filing under 35 USC §371 of PCT/NL96/00360 filed Sep. 16, 1996.

BACKGROUND OF THE INVENTION

The present invention relates to a method for removing hydrogen sulfide compounds from liquid sulfur, by passing a finely divided gas through liquid sulfur.

It is known from Journal of Physical Chemistry, Vol. 70, no.1, 234–238 that hydrogen sulfide in liquid sulfur is dissolved in the form of polysulfides, designated as $H_2S_x$ where x is an integer of at least 5, and in the form of physically dissolved $H_2S$. Through decomposition of polysulfides, hydrogen sulfide is liberated. In the present text the terms hydrogen sulfide and hydrogen sulfide compounds will be used in the sense of both $H_2S$ and $H_2S_x$, unless specified otherwise.

Sulfur produced in sulfur recovery plants contains on average 300 to 400 ppm by weight of hydrogen sulfide and polysulfides. During storage, transport or further application, the release of dissolved hydrogen sulfide can give rise to dangerous situations, for instance where people are stupefied by the very toxic $H_2S$, sometimes with a fatal result (600 ppmv is already lethal to humans), and the risk of explosion due to hydrogen sulfide released in the headspace of, for instance, storage tanks (the lower explosion limit is about 3.5% by volume of hydrogen sulfide in air). Also, problems of stench due to hydrogen sulfide can be a great nuisance. In installations that produce or process sulfur it is therefore required that the sulfur produced be degassed to remove hydrogen sulfide and polysulfides to values below 10 ppm by weight.

Dissolved hydrogen sulfide is easy to remove from liquid sulfur, for instance by stirring, spraying, pumping or by passing gas or air through it. It is considerably more difficult to remove the polysulfides. Polysulfides first have to be decomposed according to the reaction

$$H_2S_x \rightarrow H_2S + (x-1) S$$

before the hydrogen sulfide then formed can be removed from the liquid sulfur by degassing

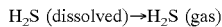

$$H_2S \text{ (dissolved)} \rightarrow H_2S \text{ (gas)}$$

The decomposition of polysulfides can be promoted through addition of nitrogenous compounds such as ammonia, ammonium salts, organic nitrogen compounds (such as alkyl amines, alkanol amines or aromatic nitrogen compounds) or urea. These nitrogen compounds function as a catalyst and thus shorten the decomposition time and hence the time required for degassing.

Société Nationale des Pétroles d' Aquitaine developed a sulfur degassing process whereby the sulfur is pumped round and sprayed, with ammonia being added as catalyst (French patent no. 1,435,788). SNPA, later known as SNEA (Société Nationale Elf Aquitaine), improved the process from a non-continuous to a continuous process in which the sulfur is circulated over two compartments and sprayed. Here too, ammonia is added as catalyst. These process variants are described in Hydrocarbon Processing October 1992 (pp. 85–89). SNEA has improved the process once more through the use of a liquid catalyst. This process is known under the name of Aquisulf. In this process too, the sulfur is circulated and sprayed. The Aquisulf process is described in Oil and Gas Journal Jul. 17, 1989, pp. 65–69.

Exxon developed a sulfur degassing process by adding a liquid catalyst in the sulfur pit or tank. In the Exxon process the sulfur is not circulated or agitated in any other way. The process saves energy but proper degassing requires a residence time of 3 to 4 days. The process is described in CEP October 1985, pp. 42–44 and in Hydrocarbon Processing May 1981, pp. 102–103.

Texas Gulf has developed a sulfur degassing process in which liquid sulfur flows down a column over dishes and the sulfur is degassed countercurrently with air (U.S. Pat. Nos. 3,807,141 and 3,920,424).

Shell Internationale Research Maatschappij developed a sulfur degassing process that is described in Dutch patent 173,735.

This method consists of a single process step in which air or a mixture of an inert gas and oxygen is passed through liquid sulfur in the presence of a catalyst, typically a nitrogen compound, in finely divided condition and thereafter the liquid sulfur and the used gas are separated from each other.

A comparable method is described in DD-A 292,635. According to this method, the treated sulfur, prior to the further processing, is subjected to a supplementary post-gassing. However, such a post-gassing has no effect or substantially no effect on the reduction of the sulfide content in the liquid sulfur.

Procor developed a sulfur degassing process known under the name of "HySpec", in which a number of gas-liquid contact mixers are arranged in series. A catalyst is added to the contact mixers and finally in the last mixing stage the sulfur is stripped of the added catalyst by passing air through it. Such a gas-liquid contact mixer consists of a mixer driven by an electric motor, which circulates the sulfur with drawn-in air over a perforated cylinder. This process was presented at the Sulphur '94 conference at Tampa Fla., Nov. 6–9, 1994 (see also WO-A 95/06616). A disadvantage of this method is the use of moving parts such as an agitator which comes into contact with the liquid sulfur. In systems with liquid sulfur, there is a great chance that moving parts will jam.

As mentioned earlier, sulfur degassing plants can be made of smaller size owing to the use of a catalyst. However, the addition of catalysts has many associated drawbacks with regard to the decrease of the quality of the sulfur. It is also known that problems of clogging readily occur as a result of these catalysts due to the formation of salts, such as ammonium sulfate. Many complaints have been heard from buyers of sulfur in the production of sulfuric acid. Some large sulfur buyers accordingly require that sulfur contain no catalyst.

Also well-known are problems of corrosion caused by the presence of salts. Many companies have had to adapt their sulfur degassing plants or have opted from the outset for a process in which no catalyst is used. A major disadvantage is that such a process requires a much longer degassing time, which entails higher investments and involves a higher energy consumption.

SUMMARY OF THE INVENTION

An object of the invention is to provide a method for removing hydrogen sulfide compounds from liquid sulfur, in which these disadvantages do not occur. Accordingly, the invention concerns a method for sulfur degassing without addition of a catalyst, in which degassing occurs utilizing a short degassing time, with a comparatively low energy consumption. More particularly, the invention relates to an uncatalyzed method for removing hydrogen sulfides from liquid sulfur, in which a residual sulfide/polysulfide content of less than 10 ppm in the liquid sulfur can be obtained in a simple manner, utilizing a technically simple adaptation of the known systems.

The method according to the invention then leads to lower $H_2S/H_2S_x$ contents in the degassed liquid sulfur than can be obtained with the known methods. Accordingly, depending on the degassing time, the $H_2S/H_2S_x$ content can be set. In practice, this also means that the method according to the invention provides more flexibility towards achieving an optimum balance of expense and results.

In a first embodiment, the invention is directed to a method for removing hydrogen sulfide compounds from liquid sulfur by passing a gas through the liquid sulfur, wherein the liquid sulfur undergoes at least two separate treatments with a finely divided gas, and in each treatment use is made of a recirculation system with gas lift, while the possibility that a part of the liquid sulfur does not undergo any treatment is prevented practically completely.

Surprisingly, it has been found that with such a method a considerable reduction of the needed residence time is obtained, without this adversely affecting the effectiveness of the removal. More particularly, the method is carried out utilizing means that largely prevent liquid sulfur from passing on untreated (prevention of by-pass or channelling).

The essential differences between the new method and the method as known from Dutch patent 173,735 are the absence of a catalyst, the use of more than one gas treatment step with recirculation and gas lift, and the prevention of the possibility that the liquid sulfur does not undergo any treatment.

Surprisingly, it has been found that the simple measure of preventing by-pass or chanelling is sufficient to reduce the residual content of sulfide in such a system to an acceptable low level of, for instance, 10 ppm. This is the more surprising in consideration of the fact that a mere few per cents of bypass are enough to result in failure to achieve the value of 10 ppm. The system is moreover particularly unpredictable because a number of effects occur concurrently. The degassing is determined both by chemical and by physical effects, while the influence of the temperature is also very great.

The counteraction of channelling in the system can take place in a number of, often simple, ways, as will be set out further hereinafter.

In the invention it is also of importance that it involves the use of at least two separate recirculation treatments of the sulfur with a finely divided gas, whereby at least two separate zones are created that involve the gassing of the sulfur. As a consequence of this, at least two zones are formed in which the sulfur, through gas lift, acquires an upward flow. Outside these zones, therefore, the sulfur will substantially flow down, so that the sulfur ends up at the lower end of the upward flow zone again and is treated with gas again. This leads to an intensive treatment with recirculation of the liquid sulfur. In general, during such a treatment the sulfur will recirculate a few hundreds of times per hour, which means in practice that recirculation occurs on average 1,000 or more times for obtaining the desired degassing.

A part of the sulfur flows on to a next zone and eventually leaves the plant, with its content of hydrogen sulfur compounds drastically reduced.

The zones of upward and of downward flow are separated from each other through partitions. These partitions naturally leave room at the top and the bottom, so that the sulfur can circulate from one zone to another zone. However, it is not requisite that a partition be present, since the action of the gas already gives rise to a rather narrowly delimited separation. From the point of view of effectiveness, however, it is preferred to use partitions. Without partitions the zones are less clearly defined and there is more mixing of sulfur with gas bubbles and sulfur without them.

In accordance with the invention, the liquid sulfur is treated with a finely divided gas. In practice, this is understood to mean that the gas is introduced into the liquid sulfur with the aid of gassing tubes provided with a multiplicity of small openings. The gas to be used can be a gas capable of reacting with the hydrogen sulfide compounds to form sulfur, such as air or an oxygen-containing gas, or a gas incapable of reacting with the hydrogen sulfide compounds, such as nitrogen, or hydrocarbon gas (natural gas). The use of an oxygen-containing gas such as air is preferred, since, as is well known, the effectiveness of the operation is greatly enhanced with it.

More particularly, the method according to the invention is an improvement of the method as described in Dutch patent 173,735. In fact, this known method has the disadvantage that use is made of a compound (catalyst) that promotes the degassing. As a result, as already indicated, the sulfur is contaminated with residues of this compound or of reaction products thereof. True, it is possible to adapt this process in such a manner that the compound mentioned is not added, and this adaptation is in fact much used in practice, but this has the disadvantage that the residence time of the sulfur becomes very long, which is not desirable from an investment point of view.

Surprisingly, the further development and optimization of this method revealed that with a particularly simple adaptation of the method a particularly strong reduction of the needed residence time can be obtained, without this being counterbalanced by a strong increase of the costs of energy. On the contrary, the costs of energy remain roughly the same, or are less.

The invention also relates to a method for removing hydrogen sulfide compounds from liquid sulfur by passing a finely divided gas through the liquid sulfur, wherein the liquid sulfur to be treated is successively passed through at least two degassing compartments, which compartments are each divided into at least two zones which, in any case at the top and bottom thereof, are in communication with each other, while in at least one zone, at the bottom thereof, said gas is supplied in finely divided form, in which zone the liquid sulfur, through the action of the gas, flows up and thereafter flows to at least one other zone, in which the liquid sulfur flows down and thereby recirculates at least partly to said first zone, and the gas is received in a headspace above the liquid sulfur, and liquid sulfur flows from a degassing compartment to a next degassing compartment and is discharged from the last degassing compartment.

For practicing the invention, generally an apparatus is used which consists of at least two, more particularly at least three, degassing compartments, while from the last degassing compartment the liquid sulfur flows over to a pumping compartment. All embodiments comprise a pumping compartment or an equivalent system for discharging the degassed sulfur. The differences between the various embodiments reside substantially in the manner in which the degassing compartments are constructed, the manner in which the division of the degassing compartments into subcompartments or zones has taken place, the manner in which the sulfur flows from one degassing compartment to a next degassing compartment or the pumping compartment, and the construction of the partition between the various degassing compartments or between the last degassing compartment and the pumping compartment.

Accordingly, a number of variants of this method according to the invention are possible. The starting point is a system in which at least two degassing compartments are present, which are divided up into at least two physically separated subcompartments or zones, which communicate at the top and the bottom.

DETAILED DESCRIPTION OF THE INVENTION

Figure 1:
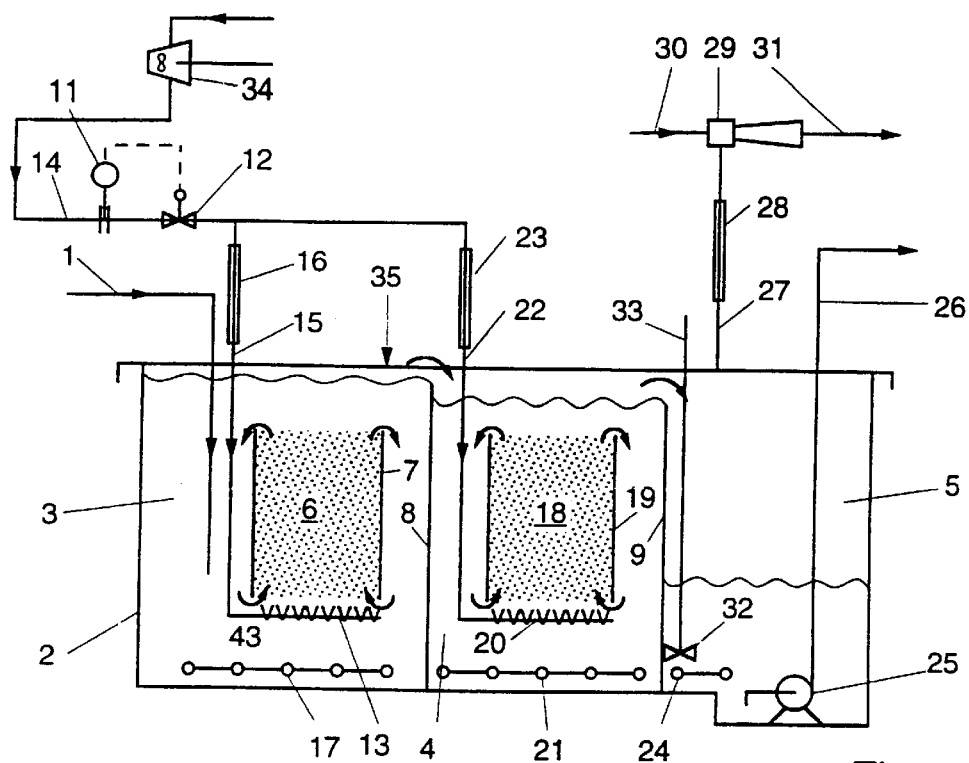
FIG. 1 is a schematic view of a section through one embodiment of an apparatus according to the invention.

A number of variations can be incorporated in the construction of the degassing compartments of the apparatus according to the invention. According to the invention, means are present for reducing the chance of by-pass or channelling of the sulfur. It is here preferred to use an apparatus in which a number of degassing compartments are used which are separated from each other by a physical partition wall. Diverse variants of this preferred embodiment are further elucidated in the drawings.

In the first embodiment, the sulfur flows to the next compartment over a partition between the different degassing compartments. The level of the sulfur in the degassing space is maintained by an overflow partition (FIG. 1). The degassed sulfur is discharged by a pump. Each degassing compartment includes a gassing space, which is formed by a vessel which at its lower side is clear of the bottom and whose upper side remains under the level of the sulfur.

Figure 6:
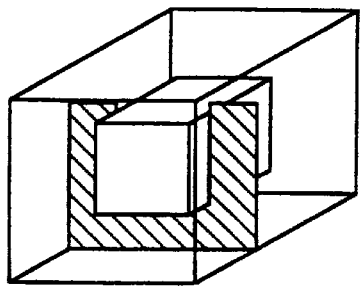
FIG. 6 is a perspective view of an embodiment of the invention wherein a dividing wall between the various degassing compartments closes off space under and laterally of a gassing vessel.
Figure 9:
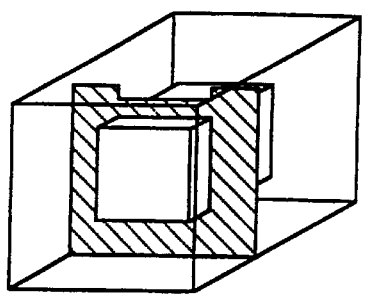
FIG. 9 is a perspective view of a modification of the embodiment of the invention according to FIG. 6, wherein the partition closing off space under and laterally of a gassing vessel also divides the gassing vessel in two, so that, in operation of the apparatus, treated sulfur flows over the partion to the next degassing compartment.
Figure 12:
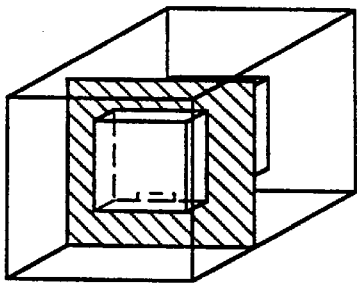
FIG. 12 is a perspective view of the embodiment of the invention according to FIG. 2.

According to a second embodiment of the method according to the invention, the dividing wall between the various degassing compartments is arranged in such a manner that it divides a 'gassing vessel' in two. This can be done, on the one hand, in the manner described in FIG. 6, where the partition only closes off the space under and laterally of the vessel. In the embodiment of FIG. 9 the partition not only divides the space around the vessel, but also divides the vessel itself in two. The sulfur flows over the partition to the next compartment. A variant of this embodiment is shown in FIG. 12, where the sulfur does not flow over the partition but flows to the next compartment through an opening in the partition. In this embodiment it is preferred to provide the opening in the partition in the vicinity of the lower side of the subcompartment in which the liquid sulfur flows up, more particularly, however, above the means for distributing the gas in the sulfur. An embodiment in which a partition according to FIG. 12 is used, is shown in FIG. 2.

Figure 2:
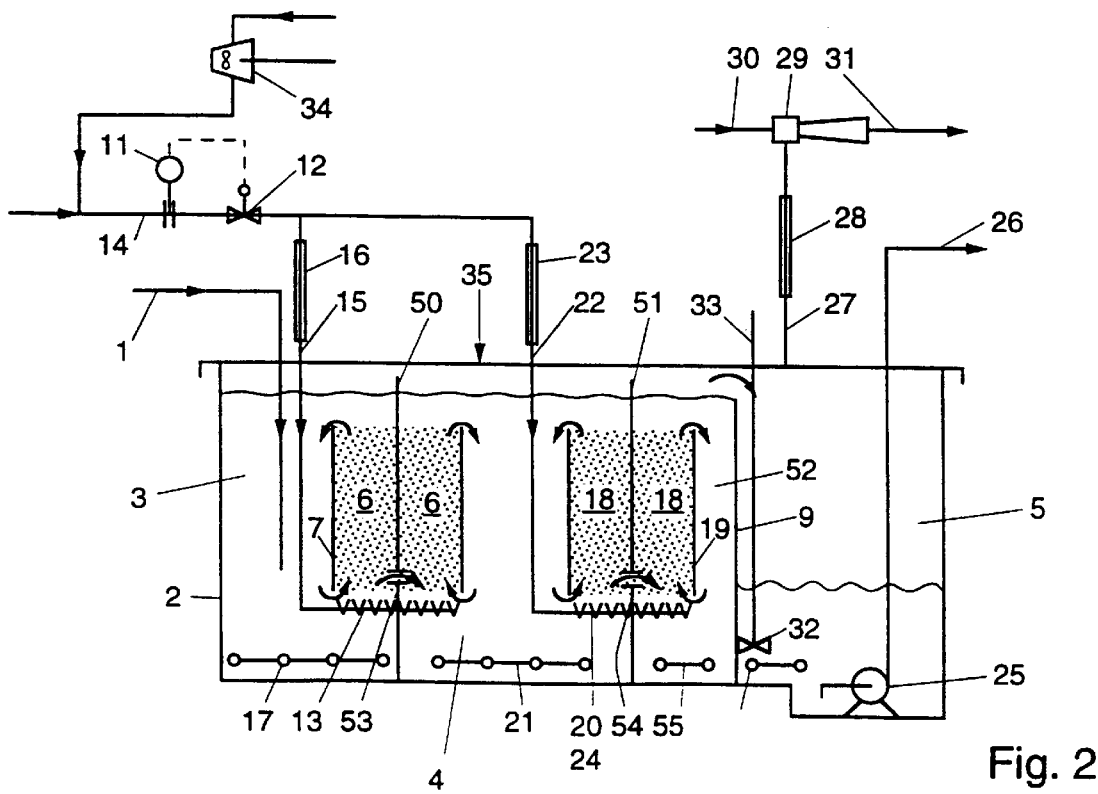
FIG. 2 is a schematic view of a section through another embodiment of an apparatus according to the invention.
Figure 3:
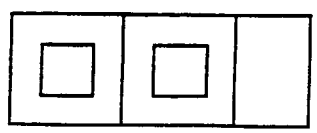
FIG. 3 is a top plan view of the embodiment of the invention according to FIG. 1.
Figure 4:
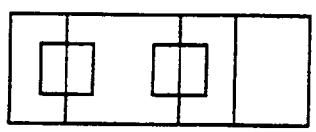
FIG. 4 is a top plan view of a modification of the embodiment of the invention according to FIG. 2, wherein the partition closes off space under and laterally of a gassing vessel, as depicted in FIG. 6.
Figure 5:
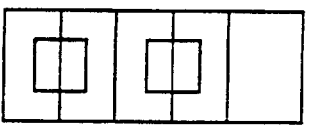
FIG. 5 is a top plan view of a modification of the embodiment of the invention according to FIG. 4, in which an additional partion is provided between gassing vessels.
Figure 7:
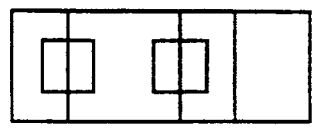
FIG. 7 is a top plan view of a modification of the embodiment of the invention according to FIG. 2, wherein a partition according to FIG. 9 is used.
Figure 8:
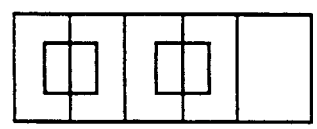
FIG. 8 is a top plan view of a modification of the embodiment of the invention according to FIG. 7, in which an additional partion is provided between gassing vessels.
Figure 10:
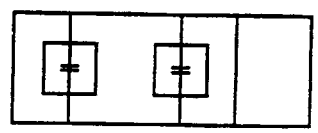
FIG. 10 is a top plan view of the embodiment of the invention according to FIG. 2.
Figure 11:
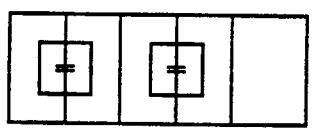
FIG. 11 is a top plan view of a modification of the embodiment of the invention according to FIG. 10, in which an additional partion is provided between gassing vessels.

In this connection, FIG. 3 can be seen as a top plan view of the construction according to FIG. 1, while FIG. 10 is a top plan view of the embodiment of FIG. 2. FIG. 4 is comparable with the embodiment of FIG. 10, the difference being that a partition as in FIG. 6 has been used. FIG. 7 in turn is different therefrom in that it uses a partition according to FIG. 9. FIGS. 5, 8 and 11 differ from FIGS. 4, 7 and 10 through the presence of an additional partition between the vessels. This additional partition, if desired, can comprise a shut-off valve which is open when the entire space is being filled and is closed in operation. This provides the advantage that the construction of the partition can be much lighter. For that matter, this is also true of the partitions in FIGS. 7, 8 en 9.

In this connection it is further observed that the division of degassing compartments into subcompartments need not necessarily take place with a vessel. It can also be advantageous for the partition between two subcompartments to extend from wall to wall of the degassing compartments, naturally with the proviso that space is to be left clear at the top and at the bottom for the transport of sulfur between the subcompartments.

In the gassing compartments, the liquid sulfur is preferably treated with an oxygen-containing gas, for instance air or a mixture of inert gas and oxygen. As an inert gas, nitrogen or steam can be used. The advantage of an oxygen-containing gas is that a part of the gaseous $H_2S$ is oxidized to elemental sulfur.

The gas discharged from the degassing compartments, consisting of the oxygen-containing gas with the removed hydrogen sulfide, is hereinafter designated as stripping gas. The stripping gas is discharged to the sulfur recovery plant or to an after-burning.

Surprisingly, it has been found that when partitions are arranged in a known degassing apparatus, in such a manner that they moreover divide the vessels of the gassing spaces (subcompartments or zones) in two, the degassing time can be reduced by more than one-third from 24 hours to less than 8 hours. As has already been indicated, other aspects can be optimized through variation of the conditions. However, it is preferred to employ residence times of 15 hours at a maximum. In general, it has been found that dividing the gassing compartments into a number of subcompartments improves the effectiveness of the degassing superproportionally.

The method according to the invention can be carried out batchwise or continuously in two or more degassing spaces for liquid sulfur. It is preferred to carry out the method continuously. The entire apparatus can be a conventional concrete pit but may also be a horizontally or vertically arranged steel tank or vessel.

The method according to the invention can be carried out by passing the liquid sulfur, derived from a sulfur recovery plant, into a degassing space, which is divided into at least two compartments by a partition. The liquid sulfur is fed into the first compartment, which is provided with a separate gassing space. The gassing space is formed by a vessel open at the top and the bottom. This vessel is of square, rectangular or cylindrical shape. Under this vessel, air or another suitable gas is introduced with the aid of a gas distributor. The gas distributor is arranged under the open vessel in such a manner that the gas is led through the sulfur in this vessel.

This gas distributor is provided with holes or other openings to obtain a good distribution. The second compartment is also provided with at least one gassing space with gas distributors. The use of a vessel which is open at the top and the bottom is preferred, but is not absolutely necessary for a proper action of the process.

In another embodiment of the method according to the invention, partitions are mounted on the vessels of the gassing spaces and these partitions divide the degassing space in this embodiment into three compartments, and further the vessels are divided in two (FIG. 2).

The partitions are mounted from wall to wall of the degassing pit or tank or vessel. The sulfur flows through an opening in the partition to the second compartment. The opening is preferably provided at the level of the underside of the vessel of the gassing space.

Then the sulfur flows to the second gassing space and via such a same opening in the second partition to the third compartment.

The partitions laterally, centrally and on the underside of the vessel prevent non-degassed sulfur from passing the gassing spaces. The partitions prevent a poor contact between the sulfur to be degassed and the stripping gas, so that the efficiency of degassing with partitions increases strongly. Thus, discrete, successively decreasing concentration levels of polysulfide and physically dissolved $H_2S$ are realized for each compartment.

The construction of the partitions or divisions can be such that they are completely closed. Especially of importance is that a restriction of the flow is involved, with the result that only a slight spread in the residence time of the sulfur occurs.

In the method according to the invention, the degassing time of the degassing system is six to fifteen hours, preferably eight hours. The maximum degassing temperature is limited by the viscosity of sulfur. Above 157° C. the viscosity of degassed sulfur increases very strongly; therefore, in the method the degassing is carried out between temperatures above the solidification point of sulfur (115° C.) and the limiting temperature in view of the viscosity. At a lower temperature, moreover, the degassing proceeds better, so that the degassing time, or the amount of gas, can be reduced.

The degassing of liquid sulfur can be carried out both at excess pressure, at atmospheric pressure and at reduced pressure.

At excess pressure of the system, the stripping gas is typically supplied with a fan, so that the tail gas can easily be discharged to the sulfur recovery plant or to the incinerator. At reduced pressure, typically a steam-driven ejector is used to extract the tail gas.

With regard to the amount of gas to be used, it can be noted in general that this is to be chosen such that the gas throughput per horizontal cross section of the gassing spaces is at least sufficient for the desired degassing, but, on the other hand, should not be too high in order to avoid foaming of the liquid sulfur.

The amount of gas to be used corresponds, at atmospheric pressure, with the volume of about 0.02–0.10 kg gas per kg of sulfur to be degassed, and preferably 0.04–0.06 kg gas per kg sulfur. It has been found, surprisingly, that when such amounts of gas are used, the residence time is reduced considerably. The gas is preferably heated to a temperature not much lower than 115° C., being the solidification point of sulfur, before it is passed through the liquid sulfur. The tail gas is discharged and returned to a sulfur recovery plant or discharged to an after-burning. A sulfur recovery plant is a plant in which hydrogen sulfide reacts with sulfur dioxide to form sulfur and water, or hydrogen sulfide is selectively oxidized with oxygen to elemental sulfur. The tail gas can be returned to the main burner, or to the selective oxidation reactor of the sulfur recovery plant so that elemental sulfur is recovered again in order to prevent $SO_2$ emission as much as possible.

Another procedure is to discharge the tail gas to an after-burning plant where the released hydrogen sulfide and the sulfur vapor present and/or entrained sulfur particles are burnt to sulfur dioxide. If the oxygen content of the tail gas is still sufficient, combustion can occur without additional supply of air.

In the method according to the invention, it has surprisingly been found, furthermore, that when an oxygen-containing gas is used as stripping gas, more than 50% of the removed hydrogen sulfide and polysulfides are oxidized to elemental sulfur, so that the $H_2S$ content in the tail gas is lower than expected on the basis of the 300–400 ppm hydrogen sulfide and polysulfides that are present in the sulfur feed. This is especially favorable if the tail gas is discharged to the after-burning. In order to prevent $SO_2$ formation upon after-burning of the tail gas as much as possible, it may be desirable to scavenge sulfur vapor and any entrained sulfur particles in a tail gas cooler, as described in European patent application 655,414, or to purify the tail gas of entrained sulfur particles with the aid of a demister mat.

When putting into operation a degassing system whereby air or a gas mixture with oxygen is used as a degassing medium, it is of importance that the lower explosion limit is not exceeded. Therefore, in the design, the circumstance that the physically dissolved hydrogen sulfide is released in a short time must be taken into consideration, so that sufficient dilution gas is supplied. This additional amount of gas can be supplied through switching on the reserve fan or ejector, so that a sufficient additional amount of dilution gas is supplied to the headspace above the liquid sulfur level. In this way, it has been found not to be necessary to install a costly analyser for the measurement of $H_2S$ in stripping gas.

The invention will now be further clarified with reference to the drawings. In FIGS. 1 and 2, two variants of the invention are represented.

In FIG. 1 liquid sulfur is supplied via line 1 to a degassing space 2 which is divided into compartments 3, 4 and 5. Feed line 1 terminates in the lower part of compartment 3 which includes a gassing space (subcompartment) 6 formed by a freely arranged vessel 7, for instance supported on legs, which is open at the top and the bottom.

The degassing compartments 3, 4 and 5 are separated by partitions 8 and 9. Essential is that partition 8 separates the two compartments, so that there is no free communication between the first compartment 3 and the second compartment 4. Sulfur from compartment 3 flows over the partition 8 to the second compartment 4. The amount of gas is controlled in proportion to the sulfur feed by means of a quantity gauge 11 and a control valve 12. The gas is fed via line 14 and 15 to the distributor 13 of the first gassing space. The gas is heated by the heating element 16. The sulfur that is degassed circulates over the walls of vessel 7 due to the driving force of the rising gas and due to the difference in mean specific weight between the sulfur with gas inside the vessel and the sulfur outside the vessel, the so-called sulfur lift.

This results in a proper mixing of sulfur and the gas. The sulfur in the first compartment is maintained at the desired temperature by means of a steam coil 17. The second compartment 4 contains a similar gassing space 18 to compartment 3, again consisting of a vessel 19, stripping gas distributors 43 and 20 and steam coil 21. Stripping gas is supplied via line 22 and heated in heating element 23. The degassed sulfur from compartment 4 flows via partition 9 to compartment 5. Compartment 5 also has a steam coil 24 and is provided with a submerged pump 25 which pumps the degassed sulfur via line 26 to a storage or transfer facility. Tail gas is extracted via line 27, which includes a heating element 28, with an ejector 29. Dilution gas is drawn in through line 35. The ejector is driven with steam via line 30; the tail gas is discharged to the sulfur recovery plant or to the after-burning via line 31.

In the overflow partition 9, just above the bottom of the degassing space 2, a shut-off valve 32 is arranged. Shut-off valve 32 is normally closed, but can, if desired, be opened, so that compartments 4 and 5 communicate. The shut-off valve 32 can be opened and closed via a rod 33.

Alternatively, the gas can be supplied via line 14 with a fan 34 in the case where degassing in the degassing space 2 is carried out under excess pressure. In this case, the tail gas is discharged directly via line 31 and ejector 29 is not needed.

In FIG. 2 liquid sulfur derived from a sulfur recovery plant is supplied via line 1 to a degassing space 2 which comprises two gassing spaces 6 and 18. Each gassing space consists of a vessel 7 and 19, respectively, with under them a gas distributor 13 and 20, respectively. The vessel is provided with a partition 50 and 51, respectively, which extends from wall to wall of the degassing space 2. These partitions 50 and 51 divide the degassing space 2 into three compartments 3, 4 and 52. These partitions 50 and 51 further divide the vessels 7 and 19 in two.

The sulfur flowing into compartment 3 via line 1 flows through an opening 53 and 54, respectively, provided in the partition 50 and 51, respectively, at the level of the underside of the vessel 7 and 19, respectively, to the next compartment 4 and, thereafter, compartment 52, respectively.

Degassing occurs in the gassing spaces 6 and 18 through intensive mixing with the gas, resulting in the so-called sulfur lift. The amount of gas which is supplied to the degassing space via line 14 is controlled through a quantity gauge 11 and a control valve 12 in proportion to the amount of sulfur supplied. The gas is supplied via line 15 and 22, respectively, to the gas distributor 13 and 20, respectively. The gas is preheated in heating element 16 and 23, respectively.

The sulfur circulates over the top of the walls of the vessels 7 and 19 as a result of the driving force of the rising gas and the difference in specific weight between the gassed sulfur within the vessel and the non-gassed sulfur outside the vessel.

The sulfur level in the degassing space 2 is maintained by the partition 9. The sulfur flows over this partition to the pumping compartment 5 which includes a pump 25 to pump the degassed sulfur via line 26 to the storage or transfer facility. The tail gas is discharged via line 27, which also includes a heating element 28. The tail gas is extracted with the aid of an ejector 29 which is driven by steam 30. Tail gas is discharged via line 31 to the sulfur recovery plant or to the after-burning, respectively. Dilution gas is supplied via line 35.

The compartments 3, 4, 52 and 5 are provided with steam coils 17, 21, 55 and 24.

In the overflow partition 9, just above the bottom, a shut-off valve 32 is arranged.

Shut-off valve 32 is normally closed and can be opened and closed via rod 33.

Alternatively, the stripping gas can be supplied via line 14 with a fan 34 in the case where degassing in the degassing space 2 is carried out under excess pressure. In this case, the tail gas is discharged directly via line 31 and ejector 29 is not installed.

An embodiment which is not shown can consist of a system according to FIGS. 4 and 5 in which instead of a U-shaped section around the vessels, only side partitions are arranged laterally of the vessels.

EXAMPLE 1

Liquid sulfur derived from a sulfur recovery plant, containing 355 ppm hydrogen sulfide and polysulfides with a temperature of 150° C., was passed into a degassing space containing five gassing spaces provided with square vessels each having a stripping gas distributor. Air was used for stripping. During the first tests, no partitions had been installed, so that the gassing spaces were in communication with each other. A series of tests were carried out, in which the amount of sulfur supplied and the amount of stripping gas, respectively, were varied. The same series of tests were then performed under equal conditions in a same degassing space but now with partitions as described in the preferred embodiment, i.e., with partitions which are installed from wall to wall and divide the vessels in two (principle of FIG. 2). The residual content of hydrogen sulfide and polysulfide was analysed in the degassed sulfur according to the procedure known in the art. The results are summarized in the following review.

| Test | Liquid sulfur supplied kg/h | Stripping air supplied kg/h | Number of aeration spaces | Degassing time hours | Ratio of air to the sulfur kg air/kg sulfur | Residual $H_2S/H_2S_x$ in the degassed sulfur ppm |
|---|---|---|---|---|---|---|
| Review of the tests in a degassing space without partitions ||||||||
| 1 | 37500 | 1838 | 5 | 12.0 | 0.0490 | 8 |
| 2 | 39800 | 919 | 5 | 11.3 | 0.0231 | 92 |
| 3 | 52500 | 1404 | 5 | 8.6 | 0.0268 | 62 |
| Review of the tests in the same degassing space with partitions according to the system of FIG. 2 ||||||||
| 4 | 37500 | 1838 | 5 | 12.0 | 0.0490 | 1 |
| 5 | 39800 | 919 | 5 | 11.3 | 0.0231 | 39 |
| 6 | 52500 | 1404 | 5 | 8.6 | 0.0268 | 31 |

EXAMPLE 2

In the degassing space with the partitions as described in Example 1, a number of tests were subsequently conducted in order to determine the criteria for degassing liquid sulfur to below 10 ppm.

| Test no | Liquid sulfur supplied kg/h | Stripping gas supplied kg/h | Number of gassing spaces | Degassing time hours | Ratio of air to the sulfur kg air/kg sulfur | Residual $H_2S/H_2S_x$ in the degassed sulfur ppm |
|---|---|---|---|---|---|---|
| Review of the tests in a degassing space according to the preferred embodiment of FIG. 2 ||||||||
| 7 | 33300 | 1877 | 5 | 13.5 | 0.0563 | 2 |
| 8 | 41700 | 1819 | 5 | 10.8 | 0.0437 | 3 |
| 9 | 50000 | 1838 | 5 | 9.0 | 0.0368 | 10 |
| 10 | 50300 | 1838 | 5 | 9.0 | 0.0366 | 6 |
| 11 | 56300 | 2936 | 5 | 8.0 | 0.0522 | 6 |
| 12 | 75000 | 3485 | 5 | 6.0 | 0.0466 | 14 |
| 13 | 30000 | 1608 | 3 | 15.0 | 0.0536 | 7 |
| 14 | 33300 | 1647 | 3 | 13.5 | 0.0494 | 2 |
| 15 | 41700 | 1606 | 3 | 10.8 | 0.0386 | 5 |
| 16 | 50000 | 1628 | 3 | 9.0 | 0.0326 | 17 |
| 17 | 56300 | 2936 | 3 | 8.0 | 0.0522 | 8 |
| 18 | 37500 | 1168 | 2 | 12.0 | 0.0312 | 25 |
| 19 | 41300 | 727 | 1 | 10.9 | 0.0176 | 70 |

What is claimed is:

1. An apparatus for removing hydrogen sulfide and hydrogen polysulfide compounds from liquid sulfur by passing a stripping gas through the liquid sulfur, said apparatus comprising:

at least two degassing compartments and a sulfur collection pit, wherein the degassing compartments are separated from each other by a first partition wall, the last degassing compartment is separated from the sulfur collection pit by a second partion wall and each degassing compartment contains at least first and second subcompartments which are separated from each other by a third partion wall and are open to each other at the top and the bottom;

wherein at least one first subcompartment in each said degassing compartment is provided, at the bottom thereof, with a plurality of stripping gas inlet nozzles and at least one second subcompartment in each said degassing compartment is not provided with stripping gas inlet nozzles; and wherein, furthermore, said at least one first subcompartment is constructed for flowing liquid sulfur over or through the first partition wall to a subsequent degassing compartment, the last degassing compartment is constructed for flowing liquid sulfur to the sulfur collection pit over the second partition wall and the apparatus is also provided with a provision for discharging gas comprising hydrogen sulfide.

2. The apparatus of claim 1, wherein the apparatus comprises at least three degassing compartments.

3. The apparatus of claim 1, wherein said at least one first subcompartment is constructed for flowing liquid sulfur over said first partition wall to a subsequent degassing compartment.

4. The apparatus of claim 1, wherein said at least one first subcompartment is constructed for flowing liquid sulfur through an opening in said first vertical partition wall to a subsequent degassing compartment.

5. The apparatus of claim 1, wherein the subcompartment of said subsequent degassing compartment receiving said flowing liquid sulfur is said one first subcompartment that is provided, at the bottom thereof, with said plurality of stripping gas inlet nozzles.

6. An apparatus for removing hydrogen sulfide and hydrogen polysulfide compounds from liquid sulfur by passing a stripping gas through the liquid sulfur, said apparatus comprising:

at least two degassing compartments and a sulfur collection pit, wherein the degassing compartments are separated from each other by a first partition wall, the last degassing compartment is separated from the sulfur collection pit by a second partition wall and each degassing compartment contains at least first and second subcompartments which are separated from each other by a third partition wall and are open to each other at the top and the bottom; and wherein, further, at least one said first and second subcompartment in each said degassing compartment is constructed for flowing liquid sulfur to a next degassing compartment through an opening in said first partition wall, the last degassing compartment is constructed for flowing liquid sulfur to the sulfur collection pit over the second partition wall and the apparatus is also provided with a provision for discharging gas comprising hydrogen sulfide.

7. The apparatus of claim 1 or claim 6 wherein said opening in said first partion wall is located below a level normally assumed by said liquid sulfur during steady state operation of said apparatus.

8. The apparatus of claim 1 or claim 6 wherein said opening in said first partion wall is located near the bottom of said wall.

9. A method for removing hydrogen sulfide and hydrogen polysulfide compounds from liquid sulfur using the apparatus of claim 1, said method comprising:

introducing the liquid sulfur to be treated into a first degassing compartment of the apparatus of claim 1;

discharging a stripping gas through said stripping gas inlet nozzles provided at the bottom of said at least one first subcompartment and upwardly through the liquid sulfur in said at least one first subcompartment so that the liquid sulfur flows upwardly, the stripping gas strips the hydrogen sulfide compounds out of the liquid sulfur, a portion of the upwardly flowing liquid sulfur flows out of said first subcompartment to at least one second subcompartment in said first degassing compartment, where said liquid sulfur flows downwardly, and a portion of the upwardly flowing liquid sulfur flows over or through said first partition wall to a subsequent degassing compartment, whereupon the liquid sulfur undergoes a second treatment with a stripping gas;

collecting the degassed liquid sulfur in a sulfur collection pit; and discharging the stripping gas comprising hydrogen sulfide out of the apparatus.

10. The method of claim 9, wherein the stripping gas is an oxygen containing gas.

11. The method of claim 9, wherein the stripping gas is air.

12. The method of claim 9, wherein the method is conducted at atmospheric or superatmospheric pressure.

13. The method of claim 9, wherein the degassed liquid sulfur contains less than 10 parts per million of hydrogen sulfide and hydrogen polysulfide compounds.

14. The method of claim 9, wherein the degassing is conducted in at least three degassing compartments, the content of the hydrogen sulfide and hydrogen polysulfide compounds is reduced to about 75 to 150 parts per million in the first degassing compartment, the content of the hydrogen sulfide and hydrogen polysulfide compounds is reduced to about 25 to 75 parts per million in the second degassing compartment, and the content of the hydrogen sulfide and hydrogen polysulfide compounds is reduced to about less than or equal to 10 parts per million in the third degassing compartment.

15. The method of claim 9, wherein about 0.02 to 0.10 kilograms of stripping gas, at atmospheric pressure, is injected into the liquid sulfur per kilogram of liquid sulfur to be degassed.

16. The method of claim 9, wherein liquid sulfur flows from one degassing compartment to a subsequent degassing compartment through an opening in said first partition wall, which opening is located under the level of the sulfur.

* * * * *